US008612283B1

(12) United States Patent
Belanger et al.

(10) Patent No.: US 8,612,283 B1
(45) Date of Patent: Dec. 17, 2013

(54) METHOD AND APPARATUS FOR EVALUATING THE COST OF OPERATING A NETWORK INFRASTRUCTURE

(75) Inventors: David Belanger, Hillsborough, NJ (US); Sam Parker, Cranbury, NJ (US); Sarat Puthenpura, Berkeley Heights, NJ (US); Simon Tse, Holmdel, NJ (US); Wenjie Zhao, Princeton, NJ (US)

(73) Assignee: AT&T Intellectual Property II, L.P., Atlanta, GA (US)

( * ) Notice: Subject to any disclaimer, the term of this patent is extended or adjusted under 35 U.S.C. 154(b) by 1668 days.

(21) Appl. No.: 11/478,945

(22) Filed: Jun. 30, 2006

(51) Int. Cl.
*G06Q 10/00* (2012.01)

(52) U.S. Cl.
USPC ............................. 705/7.35; 705/400; 704/9

(58) Field of Classification Search
USPC ............................. 705/400, 7, 35; 706/60, 52
See application file for complete search history.

(56) References Cited

U.S. PATENT DOCUMENTS

| | | | | | |
|---|---|---|---|---|---|
| 5,784,539 | A | * | 7/1998 | Lenz | 706/45 |
| 6,219,654 | B1 | * | 4/2001 | Ruffin | 705/400 |
| 6,601,026 | B2 | * | 7/2003 | Appelt et al. | 704/9 |
| 7,496,544 | B2 | * | 2/2009 | Atkin et al. | 705/400 |
| 7,523,047 | B1 | * | 4/2009 | Neal et al. | 705/7.35 |
| 7,558,773 | B2 | * | 7/2009 | Mancisidor et al. | 706/52 |
| 7,664,039 | B2 | * | 2/2010 | Croak et al. | 370/238 |
| 7,849,438 | B1 | * | 12/2010 | Hemmat et al. | 717/102 |
| 7,885,820 | B1 | * | 2/2011 | Mancisidor et al. | 705/1.1 |
| 2003/0110141 | A1 | * | 6/2003 | Boutault | 705/400 |
| 2003/0232616 | A1 | * | 12/2003 | Gidron et al. | 455/406 |
| 2004/0030563 | A1 | * | 2/2004 | Porcari et al. | 705/1 |
| 2004/0044516 | A1 | * | 3/2004 | Kennewick et al. | 704/5 |
| 2004/0073511 | A1 | * | 4/2004 | Beaumont et al. | 705/42 |
| 2004/0088158 | A1 | * | 5/2004 | Sheu et al. | 704/9 |
| 2004/0267729 | A1 | * | 12/2004 | Swaminathan et al. | 707/3 |
| 2005/0010456 | A1 | * | 1/2005 | Chang et al. | 705/7 |
| 2005/0108085 | A1 | * | 5/2005 | Dakar et al. | 705/10 |
| 2005/0131754 | A1 | * | 6/2005 | Chapman et al. | 705/10 |
| 2005/0261933 | A1 | * | 11/2005 | Magnuson | 705/1 |
| 2006/0167665 | A1 | * | 7/2006 | Ata | 703/2 |
| 2007/0016432 | A1 | * | 1/2007 | Piggott et al. | 705/1 |
| 2007/0226064 | A1 | * | 9/2007 | Yu et al. | 705/20 |
| 2007/0282876 | A1 | * | 12/2007 | Diao et al. | 707/101 |
| 2009/0106064 | A1 | * | 4/2009 | Egner et al. | 705/7 |

OTHER PUBLICATIONS

Goh, et al. "ECA rule-based support for workflows," published by Artifiical Intelligence in Engineering 15 (2001) 37-46 (pp. 1-10 of Document).*

* cited by examiner

*Primary Examiner* — Brian Epstein

(57) ABSTRACT

A rule-based method and apparatus for evaluating the cost of operating a network infrastructure are disclosed. For example, the method receives a request to evaluate the cost of operating a network infrastructure in a form of one or more rules, e.g., in a natural language format. The one or more rules are translated into at least one cost model. The method then applies the at least one cost model to determine the cost of operating the network infrastructure.

15 Claims, 4 Drawing Sheets

METHOD AND APPARATUS FOR EVALUATING THE COST OF OPERATING A NETWORK INFRASTRUCTURE

The present invention relates generally to communication networks and, more particularly, to a method and apparatus for evaluating the cost of operating an information infrastructure for networks such as the packet networks used in telecommunications.

BACKGROUND OF THE INVENTION

The Internet has emerged as a communication infrastructure, carrying traffic for a wide range of applications. Businesses and consumers connect their routers to the Internet for sending and receiving data packets. Large businesses often have multiple users in geographically separated locations interconnected either through a service provider's network or the Internet. For example, a large business or enterprise customer may have a communications solution that includes multiple local area networks attached to the Internet or to a service provider's network. The users connect their end devices such as computers and routers to the local area network. The business customers have options to either manage the infrastructure at each location by themselves, or let the service provider manage the network and the associated infrastructures at a cost. The business customers often have neither the network expertise nor the information to properly evaluate the total cost of operating a network infrastructure. Thus, the business customers will often request the service provider to assist in evaluating various options, e.g., to provide a cost estimate for managing the customer's network infrastructure by the service provider. However, modeling of the customers' infrastructure is laborious, time consuming, and costly and would require software driven computer tools. However, changing the underlying business rules requires changes in a hard-coded program and is often cost prohibitive.

Therefore there is a need for a flexible rule-based method to evaluate the cost of operating a network infrastructure.

SUMMARY OF THE INVENTION

In one embodiment, the present invention discloses a rule-based method and apparatus for evaluating the cost of operating a network infrastructure, e.g., packet networks used in telecommunications. For example, the method receives a request to evaluate the cost of operating a network infrastructure in a form of one or more rules, e.g., in a natural language format. The one or more rules are translated into at least one cost model. The method then applies the at least one cost model to determine the cost of operating the network infrastructure.

BRIEF DESCRIPTION OF THE DRAWINGS

The teaching of the present invention can be readily understood by considering the following detailed description in conjunction with the accompanying drawings, in which.

To facilitate understanding, identical reference numerals have been used, where possible, to designate identical elements that are common to the figures.

DETAILED DESCRIPTION

The present invention broadly discloses a method and apparatus for evaluating the cost of operating an information infrastructure for networks such as (but not limited to) the packet networks used for telecommunications, i.e., telecommunication network infrastructure. Although the present invention is discussed below in the context of packet networks, the present invention is not so limited. Namely, the present invention can be applied to other networks such as the cellular networks and the like. Similarly, although the present invention is described in the context of a telecommunication network infrastructure, it should be noted that it can be adapted to any type of network infrastructures, e.g., digital networks, cable networks, and the like.

Figure 1:
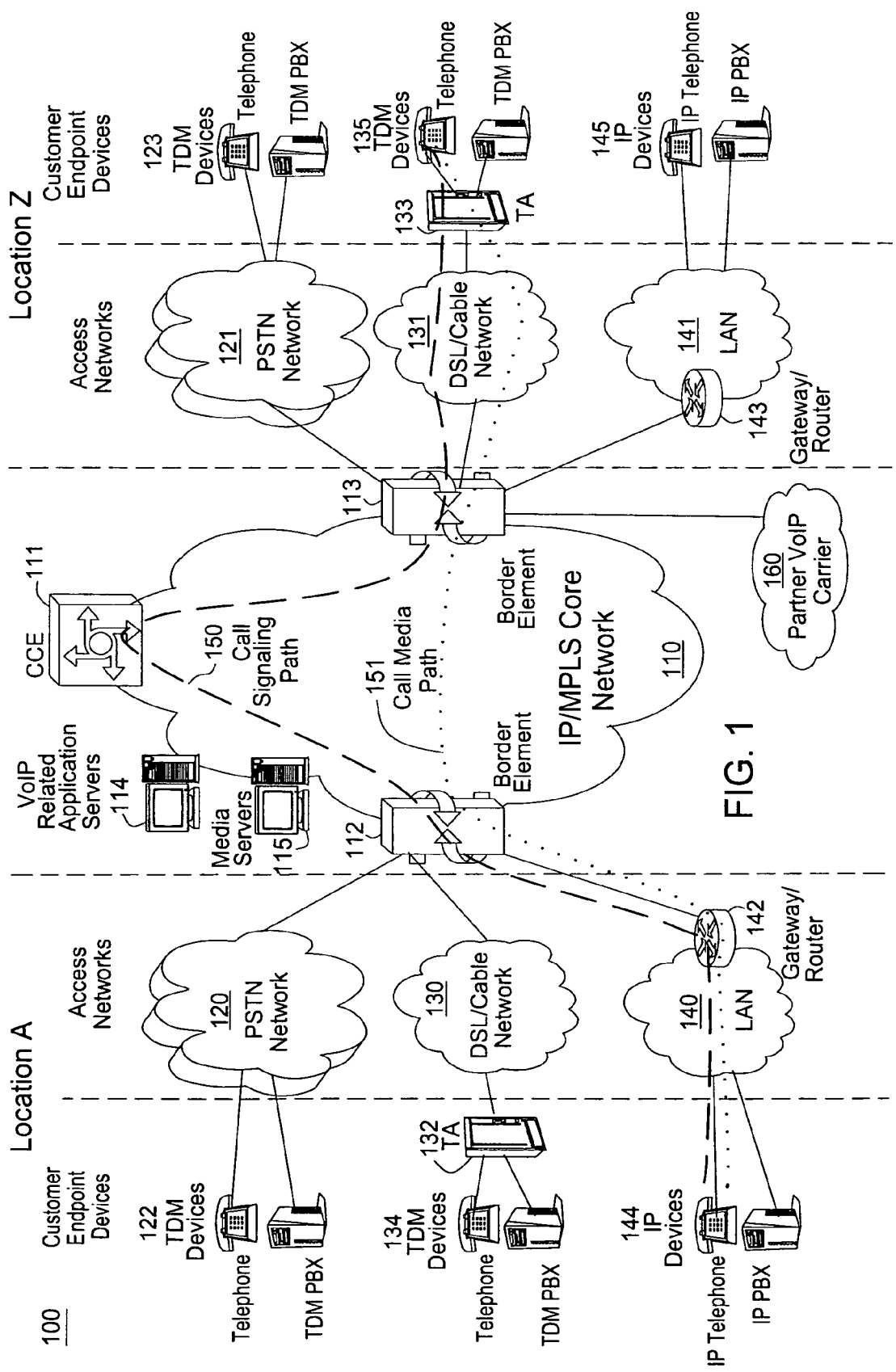
FIG. 1 illustrates an exemplary packet network.

To better understand the present invention, FIG. 1 illustrates an exemplary packet network 100, e.g., such as a Voice over Internet Protocol (VoIP) or Service over Internet Protocol (SoIP) network. Exemplary packet networks include Internet protocol (IP) networks, Asynchronous Transfer Mode (ATM) networks, frame-relay networks, and the like. An IP network is broadly defined as a network that uses Internet Protocol to exchange data packets. Thus, a VoIP network or a SoIP (Service over Internet Protocol) network is considered an IP network.

In one embodiment, the VoIP network may comprise various types of customer endpoint devices connected via various types of access networks to a carrier (a service provider) VoIP core infrastructure over an Internet Protocol/Multi-Protocol Label Switching (IP/MPLS) based core backbone network. Broadly defined, a VoIP network is a network that is capable of carrying voice signals as packetized data over an IP network. The present invention is described below in the context of an illustrative VoIP network. Thus, the present invention should not be interpreted as limited by this particular illustrative architecture.

The customer endpoint devices can be either Time Division Multiplexing (TDM) based or IP based. TDM based customer endpoint devices 122, 123, 134, and 135 typically comprise of TDM phones or Private Branch Exchange (PBX). IP based customer endpoint devices 144 and 145 typically comprise IP phones or IP PBX. The Terminal Adaptors (TA) 132 and 133 are used to provide necessary interworking functions between TDM customer endpoint devices, such as analog phones, and packet based access network technologies, such as Digital Subscriber Loop (DSL) or cable broadband access networks. TDM based customer endpoint devices access VoIP services by using either a Public Switched Telephone Network (PSTN) 120, 121 or a broadband access network 130, 131 via a TA 132 or 133. IP based customer endpoint devices access VoIP services by using a Local Area Network (LAN) 140 and 141 with a VoIP gateway or router 142 and 143, respectively.

The access networks can be either TDM or packet based. A TDM PSTN 120 or 121 is used to support TDM customer endpoint devices connected via traditional phone lines. A packet based access network, such as Frame Relay, ATM, Ethernet or IP, is used to support IP based customer endpoint devices via a customer LAN, e.g., 140 with a VoIP gateway and/or router 142. A packet based access network 130 or 131, such as DSL or Cable, when used together with a TA 132 or 133, is used to support TDM based customer endpoint devices.

The core VoIP infrastructure comprises of several key VoIP components, such as the Border Elements (BEs) 112 and 113, the Call Control Element (CCE) 111, VoIP related Application Servers (AS) 114, and Media Server (MS) 115. The BE resides at the edge of the VoIP core infrastructure and interfaces with customers endpoints over various types of access networks. A BE is typically implemented as a Media Gateway and performs signaling, media control, security, and call admission control and related functions. The CCE resides within the VoIP infrastructure and is connected to the BEs using the Session Initiation Protocol (SIP) over the underlying IP/MPLS based core backbone network 110. The CCE is typically implemented as a Media Gateway Controller or a softswitch and performs network wide call control related functions as well as interacts with the appropriate VoIP service related servers when necessary. The CCE functions as a SIP back-to-back user agent and is a signaling endpoint for all call legs between all BEs and the CCE. The CCE may need to interact with various VoIP related Application Servers (AS) in order to complete a call that requires certain service specific features, e.g. translation of an E.164 voice network address into an IP address and so on. For calls that originate or terminate in a different carrier, they can be handled through the PSTN 120 and 121 or the Partner IP Carrier 160 interconnections. A customer in location A using any endpoint device type with its associated access network type can communicate with another customer in location Z using any endpoint device type with its associated network type.

The above VoIP network is described to provide an illustrative packet network environment in which data is transmitted on communication networks. Businesses and consumers connect their computers, routers, etc. to the Internet for sending and receiving data packets. Large businesses or enterprise customers often have multiple users in geographically separated locations interconnected either through a service provider's network or the Internet. For example, a large business customer may have a communications solution that includes multiple local area networks interconnected via a service provider's network. The users at each location connect their end devices to the local area network. The infrastructure at each location may contain several servers, routers, telephony equipment, PBXs, etc. The business customers have options to either manage the infrastructure at each location by themselves, or let the service provider manage the network as well as the associated infrastructures at a cost.

However, the business customers may not have the communications network expertise and cost information to properly evaluate the options. For example, a business may not have information on equipment sparing needs, reliability analysis, maintenance, staffing, cost of labor, etc. Thus, the business customers will often request the service provider to assist in evaluating various options, e.g., to provide a cost estimate for managing the customer's network infrastructure by the service provider under different scenarios. However, the modeling of the customers' infrastructure is laborious, time consuming, and costly and often needs sophisticated software driven computer models. Moreover, changing the underlying business rules may require changes in a hard-coded program which is cost prohibitive. Therefore, there is a need for a rule-based method to evaluate the cost of operating a network infrastructure.

In one embodiment, the present invention discloses a rule-based method to evaluate the cost of operating a network infrastructure for networks such as packet networks used for telecommunications services. In order to clearly illustrate the present invention, the following terminology will first be described:

Rules;
Events, conditions and actions;
Rule engine; and
Rule salience.

A rule broadly refers to a business rule that describes a service offering scenario and in one embodiment, can be expressed in simple human natural language (a natural language format). In one embodiment, a rule comprises three parts or elements: at least one event, at least one condition and at least one action. An event broadly refers to a situation or a cause that activates a rule. Condition broadly refers to a filter that is used to validate or qualify the rule. Action refers to an activity that is recommended to address the event. Thus, a rule for a service may be created by combining event(s), condition(s) and action(s).

For example, a customer, e.g., a bank, may have a rule that states "network management systems (e.g., servers, etc.) at large branch offices are to be attended at all times." To illustrate, the event of "at all times" may be represented as a request for 24 hours a day, 7 days a week (24×7) coverage. The condition of "large branch offices" may be represented as a condition comprising branches serving more than five thousand accounts. The action may be represented as allocating five (5) people to provide a 1-person coverage in 8 hour shifts to satisfy the (24×7) coverage.

A "rule engine" is a software program used to manage rules. In one embodiment, it is a software component that separates a set of business rules from other application codes. In other words, the rule engine may adjust, delete or add new rules that are used by other software modules. Since the set of rules are managed separately, changes to the set of rules will minimize impact to other software modules. Thus, the rule engine enables users to modify rules frequently without requiring programming expertise. The rule engine also constantly monitors the rules to be triggered by various events. When multiple rules are activated, the rule engine also provides rule salience as defined below.

Rule salience refers to the order in which rules are acted upon (e.g., activated or fired) when multiple rules are active. A rule is said to have a higher salience than another rule if it gets activated first.

Figure 2:
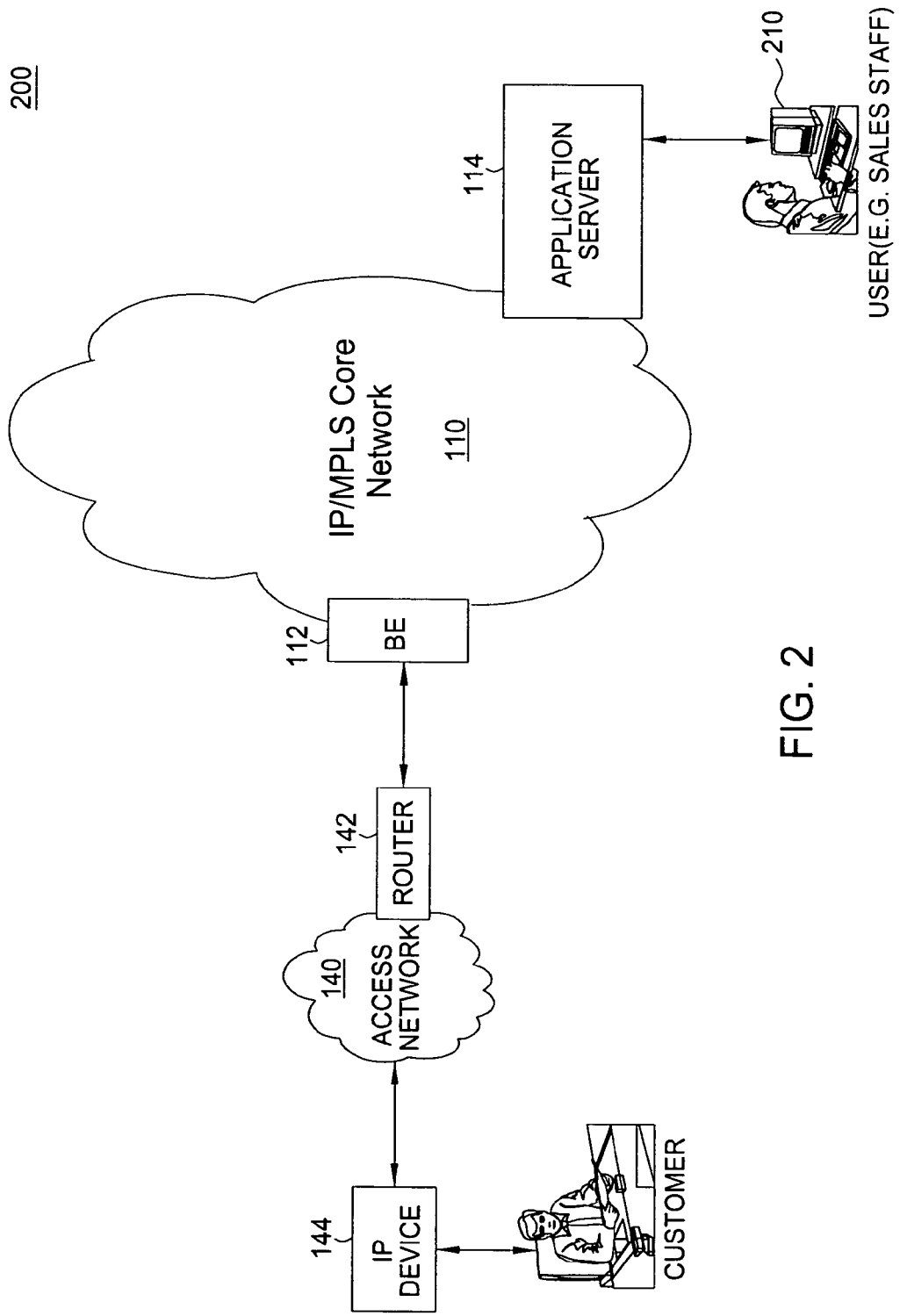
FIG. 2 illustrates an exemplary network of the current invention.

FIG. 2 illustrates an exemplary network 200 of the current invention. The customer is using an IP device 144 to access communications services, e.g., to send and receive data and voice packets. The IP device 144 is connected to an access network 140, e.g., a LAN belonging to the customer. The packets originated by the IP device 144 traverse the access network 140 towards the router 142. The router 142 is connected to an IP/MPLS core network 110 (e.g., operated by a service provider) through a border element 112. Packets originated by the IP devices 144 traverse the core network 110 from border element 112 towards a destination address, e.g., a public web server (not shown), or a private server located at a remote LAN (not shown), e.g., a remote office of the customer. In one embodiment, the customer may desire to investigate whether it is more cost effective to manage its own network infrastructure or to outsource that function, e.g., to the service provider.

In one embodiment, an application server 114 located in the IP/MPLS core network 110 is utilized for implementing the present invention to evaluate the cost of operating an information infrastructure, e.g., a network infrastructure, for a customer. For example, the service provider may gather features of services it wishes to offer and pricing schemes in a format of a set of rules from sales managers, network experts, offer managers, etc. The service provider may also gather the cost of components for implementing one or more network infrastructure solutions by customers and/or service providers. For example, a service described by a service offer manager may require specific levels of network reliability and availability. For example, a rule in human natural language for a service may state "network outages are limited to less than one minute per year". The cost of components when this rule is active may then include factors such as the need for redundancy of hardware, sparing in case of failures, using products from a variety of vendors, having staff for maintenance and repair, etc. The cost model addresses all aspects of running a network infrastructure.

The method then creates a set of events, a set of conditions, and a set of actions. For the above example, an event might be a limitation on network outage of less than one minute per year per customer location. A condition might be a customer location servicing or supporting more than fifty end devices of the customer. An action might be providing onsite Information Technology (IT) staff for each location. In another example, an event might be a requirement for 24×7 customer care coverage for a customer location. A condition might be a customer location that supports or experiences network traffic volume of 100 Mbits/sec or greater. An action might be providing a staffing of five people per customer location and so on.

In one embodiment, the customer sends a request to evaluate the cost of operating an information infrastructure to application server 114 using IP device 144. The received request may describe the service scenario(s) to be evaluated in the form of rules. For example, a rule may state "large offices require 24×7 IT staffing." Namely, the present invention can be implemented to automatically interact with the customers.

Alternatively, the customer provides rules or requirements associated with the customer's network infrastructures to a user 210 (e.g., sales staff of the service provider). In turn, the user will translate the requirements associated with the customer's network infrastructures into one or more rules to the application server 114.

The set of rules is then translated into at least one cost model. For example, the rules may be translated into one or more cost models, e.g., a customer managed solution, a service provider managed solution, etc. For example, a cost model for a customer managed solution may allocate dedicated IT staff resources (e.g., IT staff resources that are dedicated to only serve a particular customer), while a cost model for a service provider managed solution may allocate shared IT staff resources (e.g., IT staff resources of the service provider that are dedicated to serve all customers of the service provider).

In creating cost models, the present invention may interact with the user. For example, the present invention may present a series of questions to the user. For the above example, a question might be presented to determine how many locations the customer currently has or will have, which locations have network traffic volume of 100 Mbits/sec or greater, which locations require 24×7 coverage, how many IT staffs are employed at each customer site to support the customer's network infrastructure, what is the total cost to the customer for each IT staff, and so on.

Furthermore, since the present invention is intended to interact with users who have a limited expertise in programming skills (e.g., sales staff), the present invention is implemented to present clarification questions to the user. For example, if a rule expressed in natural language that is received from a user cannot be properly translated into a recognizable three part syntax (i.e., event-condition-action) or a requirement cannot be associated with a known condition, the present invention is implemented to issue clarifying questions to the user. To illustrate, if a user provides the rule "the entire system should be generally monitored and supported by at least one IT staff", then the present invention may respond with one or more questions, e.g., "Do you mean 24×7 monitoring?", "If 24×7 monitoring is not required, please specify the daily monitoring requirements in terms of hours and/or specify the day of the week monitoring requirements in terms of hours.", "Do you mean 24×7 monitoring for all customer sites?", "If 24×7 monitoring is not required for all sites, please specify the number of customer sites that will require 24×7 monitoring.", and so on. It should be noted that natural language recognizer and/or natural language parser are well known in the art.

The input from the user is utilized to evaluate different network configurations as well as to conduct financial analysis, e.g., that compares customer managed and service provider managed options. For the above example, network configurations using different vendor products, network managed by customer versus by service provider, cost of adding or scaling up a location, etc. may be evaluated. It should be noted that information, e.g., associated with features and/or pricing schemes are obtained from various sources, e.g., offer managers, vendors, known industry standard costs, internal historical cost data, prior to the implementation of the present invention. Certainly, such information will need to be updated from time to time.

In one embodiment, a new service offering may be added by creating rules that describe the new service using new or already defined events, conditions and actions. For example, if a service provider offers redundancy on one product, it may add redundancy on other services by adding new rules for those services being amended.

Once the cost models are generated, the results of the evaluation are provided to the customer. For example, a result may show a service provider solution with 24×7 coverage having a service cost that is 25% lower than a customer managed solution. In another example, a result may show a service provider solution with 24×7 coverage having a service cost that is 25% higher than a customer managed solution, but the service provider solution provides a level of redundancy or network survivability that is lacking in a customer managed solution.

Figure 3:
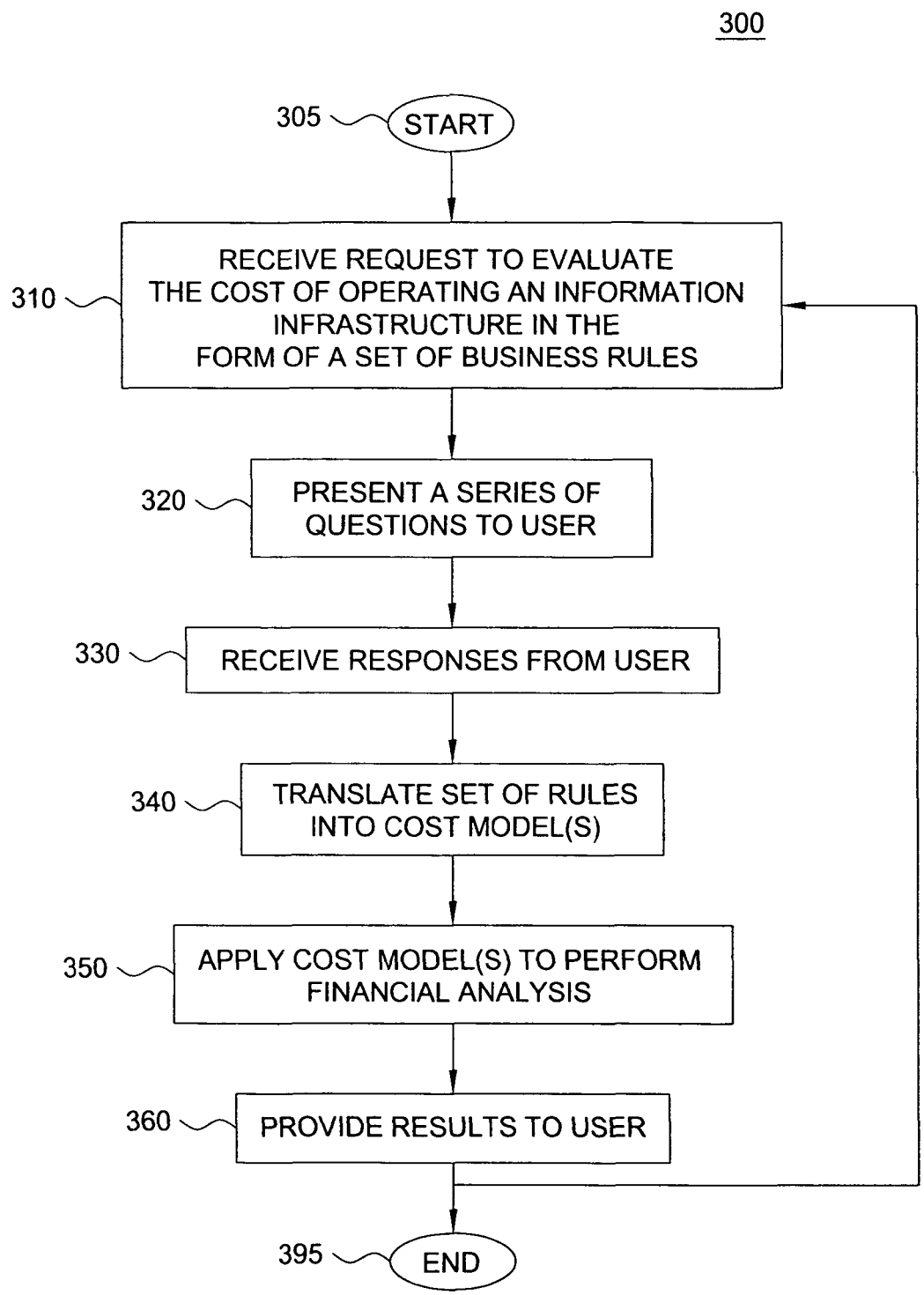
FIG. 3 illustrates a flowchart of a method for evaluating the cost of operating an information infrastructure.

FIG. 3 illustrates a flowchart of a method 300 for evaluating the cost of managing an information infrastructure, e.g., a network infrastructure. In one embodiment, the cost of managing an information infrastructure, e.g., a network infrastructure is broadly defined to include the cost of the underlying network components, e.g., hardware and software, the cost of operating the network components, the cost of servicing the network components if failures occur, the projected cost of replacement of network components given a particular time period, the projected cost of training support staff, and the like. Method 300 starts in step 305 and proceeds to step 310.

In step 310, method 300 receives a request to evaluate the cost of operating an information infrastructure in the form of a set of rules. The request may comprise operating the entire information infrastructure or only a portion of the entire information infrastructure of the customer. For example, an enterprise customer, e.g., a bank, may request a service provider (e.g., a network service provider) to evaluate the cost of operating the bank's network infrastructure, e.g., interconnecting various branch offices and the main office location. The bank may have a set of rules for the operating service to be provided by the service provider. For example the bank may specify "large branch offices should have 24×7 IT staff coverage", and the like.

In step 320, method 300 may optionally present a series of questions to the user. Namely, one or more additional pieces of information are needed to formulate one or more rules. For the example above, if it is unclear from the set of provided requirements, then the service provider may request which branches are to be considered a large branch. Another request may focus on which branches are expected to be large within one year, two years, etc. The service provider determines the series of questions such that the evaluation may take into account growth plan, etc.

In step 330, method 300 receives responses from the users. For example, the user may indicate 5 branches are large, 95 branches are small, and five of the small branches are expected to be large within one year.

In step 340, method 300 translates the received set of rules into one or more cost models. It should be noted that the translation process accounts for rule salience, i.e., rules are translated in a particular order. For example, rules associated with safety or security may have a higher salience than rules associated with cost or performance. Rule salience can be defined by a user. For the above example, a cost model may comprise a customer managed solution, e.g., allocating one full-time IT staff for large branches serving a predefined number of customers. Other small branch locations may have one IT staff shared among multiple locations, e.g., one full-time IT staff for every 5 small branch locations. For the same example, a cost model for a service provider managed solution may allocate five full-time IT staffs shared among all locations of the enterprise customer.

In step 350, method 300 applies cost model(s) to perform financial analysis. Namely, the expected cost for each cost model can be generated and compared with other cost models. For example, the customer may present a plurality of slightly different scenarios (e.g., service the entire network infrastructure, service only a subset of the overall network infrastructure, service only larger branch locations, and so on), where a cost model is generated for each scenario for comparison purposes.

In step 360, method 300 provides the results of the financial analysis to the user. For example, results of the two cost models above may be presented to the customer. The customer may then utilize the information to determine whether or not to operate or manage a network infrastructure by itself or to outsource that function as a service to be provided by a service provider, e.g., a network service provider. The method then returns to step 310 to receive another set of rules or to step 395 to end the current process.

One advantage of the present invention is the flexibility in creating and changing rules to create a cost model for a particular customer. Namely, a list of events, a list of conditions and a list of actions can all be created and stored in addition to the cost of the underlying components (e.g., hardware cost, software cost, personnel cost, and the like). Cost models can then be easily created from a set of rules that is inputted by users with limited programming knowledge. Since the format for the rules is not rigidly defined, it allows users to formulate a wide array of rules to address the need of a customer from a library of defined events, conditions and actions. For example, if adding a 1-person (24×7 coverage) for a service requires a staffing cost of 5 employees, then a rule for another service requiring 2-person 24×7 coverage may be created by simply applying the same ratios, e.g., 10 employees for the new service and so on.

Figure 4:
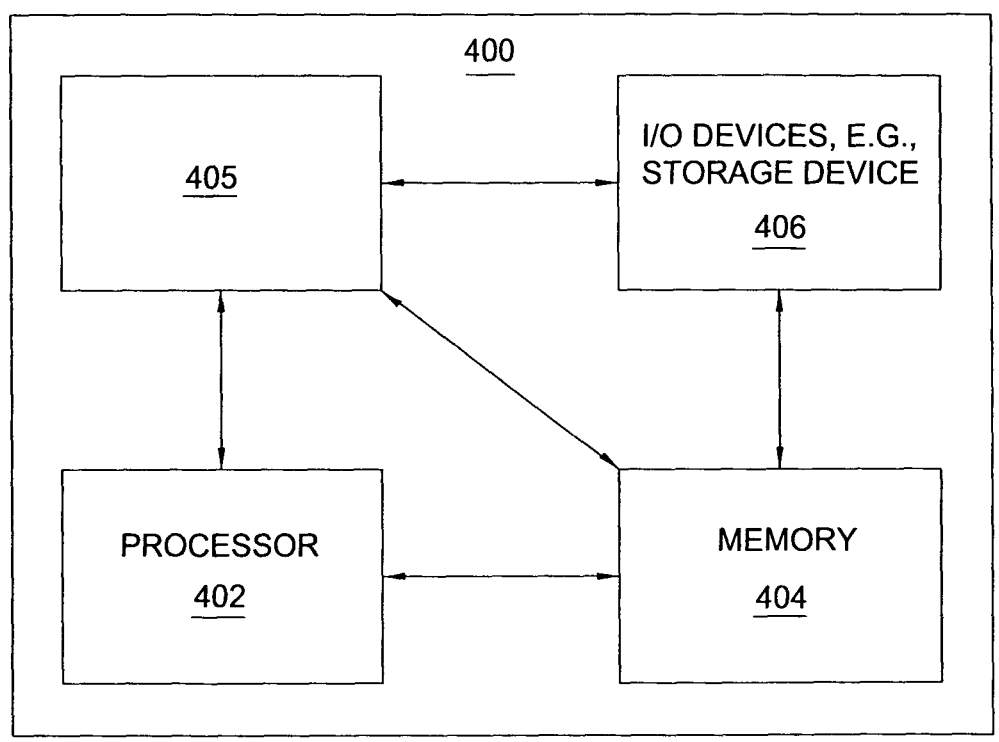
FIG. 4 illustrates a high-level block diagram of a general-purpose computer suitable for use in performing the functions described herein.

FIG. 4 depicts a high-level block diagram of a general-purpose computer suitable for use in performing the functions described herein. As depicted in FIG. 4, the system 400 comprises a processor element 402 (e.g., a CPU), a memory 404, e.g., random access memory (RAM) and/or read only memory (ROM), a module 405 for evaluating the cost of operating an information infrastructure, and various input/output devices 406 (e.g., storage devices, including but not limited to, a tape drive, a floppy drive, a hard disk drive or a compact disk drive, a receiver, a transmitter, a speaker, a display, a speech synthesizer, an output port, and a user input device (such as a keyboard, a keypad, a mouse, and the like)).

It should be noted that the present invention can be implemented in software and/or in a combination of software and hardware, e.g., using application specific integrated circuits (ASIC), a general purpose computer or any other hardware equivalents. In one embodiment, the present module or process 405 for evaluating the cost of operating an information infrastructure can be loaded into memory 404 and executed by processor 402 to implement the functions as discussed above. As such, the present method 405 for evaluating the cost of operating an information infrastructure (including associated data structures) of the present invention can be stored on a computer readable medium or carrier, e.g., RAM memory, magnetic or optical drive or diskette and the like.

While various embodiments have been described above, it should be understood that they have been presented by way of example only, and not limitation. Thus, the breadth and scope of a preferred embodiment should not be limited by any of the above-described exemplary embodiments, but should be defined only in accordance with the following claims and their equivalents.

What is claimed is:

1. A method for evaluating a cost of operating a network infrastructure, comprising:

receiving, by a processor, a request to evaluate the cost of operating the network infrastructure in a form of a first plurality of rules, wherein the first plurality of rules is presented in a natural language format;

translating, by the processor, the first plurality of rules from the natural language format into a cost model, wherein the translating comprises translating the first plurality of rules from the natural language format into a second plurality of rules comprising a plurality of events, conditions and actions, wherein a rule in the first plurality of rules having a higher salience is translated prior to a rule in the first plurality of rules having a lesser salience, where a salience of each of the rules in the first plurality of rules is defined by a user, wherein the cost model comprises the second plurality of rules; and applying, by the processor, the cost model to determine the cost of operating the network infrastructure.

2. The method of claim 1, wherein the events, the conditions, and the actions are previously defined.

3. The method of claim 1, wherein the cost of operating the network infrastructure comprises a cost of operating the network infrastructure by a customer and a cost of operating the network infrastructure by a service provider.

4. The method of claim 1, wherein the receiving the request comprises:

receiving a rule of the first plurality of rules;
presenting a question to a user; and
receiving an answer in response to the question.

5. The method of claim 1, wherein the request is received by a service provider who is providing a network service to a portion of the network infrastructure.

6. The method of claim 1, wherein the request to evaluate the cost of operating the network infrastructure comprises a cost of operating the portion of the network infrastructure.

7. The method of claim 1, wherein the network infrastructure comprises a telecommunication network infrastructure.

8. A non-transitory computer-readable medium storing instructions which, when executed by a processor, cause the processor to perform operations for evaluating a cost of operating a network infrastructure, the operations comprising:
   receiving a request to evaluate the cost of operating the network infrastructure in a form of a first plurality of rules, wherein the first plurality of rules is presented in a natural language format;
   translating the first plurality of rules from the natural language format into a cost model, wherein the translating comprises translating the first plurality of rules from the natural language format into a second plurality of rules comprising a plurality of events, conditions and actions, wherein a rule in the first plurality of rules having a higher salience is translated prior to a rule in the first plurality of rules having a lesser salience, where a salience of each of the rules in the first plurality of rules is defined by a user, wherein the cost model comprises the second plurality of rules; and
   applying the cost model to determine the cost of operating the network infrastructure.

9. The non-transitory computer-readable medium of claim 8, wherein the events, the conditions, and the actions are previously defined.

10. The non-transitory computer-readable medium of claim 8, wherein the cost of operating the network infrastructure comprises a cost of operating the network infrastructure by a customer and a cost of operating the network infrastructure by a service provider.

11. The non-transitory computer-readable medium of claim 8, wherein the receiving the request comprises:
   receiving a rule of the first plurality of rules;
   presenting a question to a user; and
   receiving an answer in response to the question.

12. The non-transitory computer-readable medium of claim 8, wherein the request is received by a service provider who is providing a network service to a portion of the network infrastructure.

13. The non-transitory computer-readable medium of claim 8, wherein the request to evaluate the cost of operating the network infrastructure comprises a cost of operating the portion of the network infrastructure.

14. The non-transitory computer-readable medium of claim 8, wherein the network infrastructure comprises a telecommunication network infrastructure.

15. An apparatus for evaluating a cost of operating a network infrastructure, comprising:
   a processor; and
   a computer-readable medium storing instructions which, when executed by the processor, cause the processor to perform operations, the operations comprising:
      receiving a request to evaluate the cost of operating the network infrastructure in a form of a first plurality of rules, wherein the first plurality of rules is presented in a natural language format;
      translating the first plurality of rules from the natural language format into a cost model, wherein the translating comprises translating the first plurality of rules from the natural language format into a second plurality of rules comprising a plurality of events, conditions and actions, wherein a rule in the first plurality of rules having a higher salience is translated prior to a rule in the first plurality of rules having a lesser salience, where a salience of each of the rules in the first plurality of rules is defined by a user, wherein the cost model comprises the second plurality of rules; and
      applying the cost model to determine the cost of operating the network infrastructure.

* * * * *